United States Patent [19]

Spera et al.

[11] Patent Number: 5,403,390
[45] Date of Patent: Apr. 4, 1995

[54] CUPROUS SULFIDE MARINE ANTIFOULANT PAINT

[76] Inventors: Richard J. Spera, 28 Twin Cedar La., Northport, N.Y. 11768; Joseph M. Wentzell, P.O. Box 1096, Ruskin, Fla. 33570

[21] Appl. No.: 208,700

[22] Filed: Mar. 11, 1994

[51] Int. Cl.⁶ .............................. C09D 5/14
[52] U.S. Cl. .................... 106/15.05; 424/78.09; 523/122
[58] Field of Search ............ 106/15.05; 523/122; 424/78.09, 637

[56] References Cited

U.S. PATENT DOCUMENTS

| | | | |
|---|---|---|---|
| 3,615,744 | 10/1971 | Yokoo et al. | 106/18.31 |
| 4,260,700 | 4/1981 | Cassutt et al. | 525/113 |
| 4,270,953 | 6/1981 | Nakagawa et al. | 106/16 |
| 4,439,555 | 3/1984 | Doi et al. | 106/15.05 |
| 4,774,080 | 9/1988 | Yamamori et al. | 424/78.09 |
| 5,188,663 | 2/1993 | Ikari et al. | 106/18.33 |

*Primary Examiner*—Anthony Green
*Attorney, Agent, or Firm*—Gregory J. Gore

[57] ABSTRACT

An antifoulant patent includes the ingredient of cuprous sulfide or cupric sulfide, both of which offer a hostile surface to chelating algae while retaining a repelling effect on barnacles and mollusks. In one embodiment, the composition comprises from 40 to 75 percent by weight of cuprous sulfide; from 10 to 50 percent by weight of an epoxy resin; from 5 to 25 percent by weight of curing agents; and from 1 to 15 percent by weight of glass fibers. The antifoulant coating results in a colorfast surface and the preferred embodiment has been devised to have a stable black color.

2 Claims, No Drawings

CUPROUS SULFIDE MARINE ANTIFOULANT PAINT

FIELD OF THE INVENTION

This invention relates to antifoulant marine coatings. More specifically, it relates to compounds containing both copper and sulfur which promotes the repulsion of underwater growths, such as barnacles and mollusks.

BACKGROUND OF THE INVENTION AND DESCRIPTION OF PRIOR ART

The growth of underwater life, such as barnacles, mollusks and algae which attach to submarine objects, creates problems maintaining or using these structures. This problem is most commonly addressed by the use of a coating, such as a paint, which repels the unwanted growth. Many of these coatings, such as the commercially available product, EPCO-TEK 2000(R), which contains copper powder, is used with much success. The EPCO-TEK product is the closest prior art of which the applicants are aware. The exact formulation of this product is further described herein.

The EPCO-TEK compound and other copper-containing coatings, however, have little or no effect on chelating algae which requires sunlight and, therefore, is found at and just below the waterline. This problem is significant not only because of the unwanted presence of the algae itself, but also because the algae complexes the copper, negating the effect of the copper on barnacles and mollusks and allowing them to grow on what was a previously repelling surface. Another problem with antifoulant paints is the high percentage of copper they contain which makes it difficult to establish reliable colors through pigmentation. Small chemical variations in the water cause a differing copper compound formulation, thereby causing changes in color. There is therefore a need in the art of marine antifoulant coatings which is effective in retarding the growth of chelating algae at the waterline of floating objects, such as boats, docks, buoys, etc., which solves the problems of the prior art described above.

SUMMARY OF THE INVENTION

In order to solve the problem in the prior art described above, the present antifoulant compound has been devised. Extensive experimentation has revealed that cuprous sulfide offers a more hostile surface to the chelating algae while retaining a repelling effect on barnacles and mollusks. The compound of the present invention may take two forms, by either employing cuprous sulfide ($Cu_2S$) or cupric sulfide (CuS) as the active ingredient.

The compound of the present invention was obtained by making a direct substitution of $Cu_2S$ and CuS for the copper in the EPCO-TEK 2000(R) compound. Experience has shown that the effectiveness of copper as a barnacle repellant drops rapidly as the copper content falls below 40 weight percent, and does not increase significantly above 55 weight percent. The direct substitution of CuS sulfide for copper powder in the EPCO-TEK 2000(R) compound results in a copper percent weight of approximately 43.12%, and the substitution of $Cu_2S$ results in a copper weight percent of approximately 51.80% and, therefore, both forms of the invention provide the requisite copper content shown to repel barnacle growth. The copper sulfide antifoulant of the present invention also results in a colorfast surface, and the present invention has been devised to have a stable black color and low leach rates much desired by the owners of motor yachts, sports fishermen, manufacturers of outboard motors, utilities and anyone desiring an antifoulant coating.

More specifically, the applicants have devised a marine antifoulant coating having the composition which comprises: from 40 to 75 percent by weight of cuprous sulfide; from 10 to 50 percent by weight of an epoxy resin; from 5 to 25 percent by weight of curing agents; and from 01 to 15 percent by weight of glass fibers. An alternative composition devised by the applicants is a marine antifoulant coating having the composition which comprises: from 30 to 75 percent by eight of cupric sulfide; from 10 to 50 percent by weight of an epoxy resin; from 5 to 25 percent by weight of curing agents; and from 1 to 15 percent by weight of glass fibers.

It is therefore the main object of this invention to create a marine antifoulant coating compound which retards the formation of algae growth, as well as the growth of other underwater life such as barnacles and mollusks. It is a further object of the present invention to provide a marine antifoulant coating which provides a stable coloration through pigmentation. Other objects, advantages and novel features of the invention will become apparent to those of ordinary skill in the art from the following description of the preferred embodiment.

DESCRIPTION OF THE PREFERRED EMBODIMENT

As explained above, the present invention was created by modifying the commercially available EPCO-TEK 2000(R) product. The EPCO-TEK 2000(R) contains an epoxy resin, glass fibers, copper powder, and a hardener. This product has a 62.5 weight percent copper metal powder when mixed with the hardener. The chart below shows the proportion of constituents of the EPCO-TEK 2000(R) composition and of the present invention as parts by weight.

|  | EPCO-TEK 2000(R) (Prior Art) | INVENTIONS $Cu_2S$ or CuS | |
| --- | --- | --- | --- |
| Cupric sulfide | 0 | 0 | 5.44 |
| Cuprous sulfide | 0 | 5.44 | 0 |
| Copper powder | 5.35 | 0 | 0 |
| Bisphenol A epoxy resin | 1 | 1.00 | 1.00 |
| Polyglycol di-epoxide | 0.5 | 0.50 | 1.50 |
| Glass fibers | 0.58 | 0.59 | 0.59 |
| Polydimethyl siloxane | 0.055 | 0 | 0 |
| A polyamidoamine | 0.895 | 0.85 | 0.85 |

Both the cupric sulfide and cuprous sulfide versions of the present invention were extensively tested. One panel each was cast, directly substituting $Cu_2S$ and CuS for the Cu in EPCO-TEK 2000(R). The two panels were epoxied on a quarry tile side-by-side and lightly wet-sanded with 220-grit wet/dry sandpaper. A second quarry tile was left untreated. Both quarry tiles were then hung from a boat coated with the EPCO-TEK 2000(R) at the waterline so one-quarter of each panel was above the waterline. The panels faced southeast to allow maximum sun exposure.

After three months exposure in Tampa Bay, Fla., the chelating algae growth on the $Cu_2S$ panel was approximately one-half that on the CuS panel, and one-half that of the EPCO-TEK 2000(R) which was applied directly to the hull of the boat at the waterline. There was one barnacle on the CuS sample, but none on the $Cu_2S$ sample. The panels were continued in the testing for an additional four months. A heavy coating of chelating algae built up on the panels, however, the ratio of 2 to 1 of the growth on the CuS versus $Cu_2S$ sample remained constant. After seven months of waterline exposure, the samples were cleaned. One large and two very small barnacles were removed from the CuS sample. The samples were then hung from a seawall so as to remain submerged completely at low tide. Under such conditions, chelating algae did not grow, but slime did grow. After one year, the untreated quarry tile was encrusted in barnacles, however, there were no barnacles on either of the copper sulfide panels. There appeared to be no deterioration of the color, even on those areas of the panels exposed above the water during the early tests.

These tests demonstrate that either the CuS or $Cu_2S$ compound would assure long life to a repelling surface. However, the solubility of CuS in water is approximately 0.3 ppm; and that of $Cu_2S$ is about 0.001 ppb. Therefore, environmentally, $Cu_2S$ would be the better choice of material for waterline conditions. However, if cost is to be considered, the CuS would offer significant savings while also providing a colorfast surface while maintaining the desired repulsion of barnacle and mollusk growth. Both versions adequately repel the growth of algae.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A marine antifoulant coating composition, comprising:
   from 40 to 75 percent by weight of cuprous sulfide;
   from 10 to 60 percent by weight of an epoxy resin;
   from 5 to 25 percent by weight of curing agents; and
   from 1 to 15 percent by weight of glass fibers.

2. A marine antifoulant coating composition, comprising:
   from 30 to 75 percent by weight of cupric sulfide;
   from 10 to 50 percent by weight of an epoxy resin;
   from 5 to 25 percent by weight of curing agents; and
   from 1 to 15 percent by weight of glass fibers.

* * * * *